March 19, 1946.  G. E. DATH  2,396,774

FRICTION SHOCK ABSORBER

Filed May 4, 1944

Inventor
George E. Dath
By Henry Fuchs
Atty.

Patented Mar. 19, 1946

2,396,774

UNITED STATES PATENT OFFICE 2,396,774

FRICTION SHOCK ABSORBER

George E. Dath, Mokena, Ill., assignor to W. H. Miner, Inc., Chicago, Ill., a corporation of Delaware Application May 4, 1944, Serial No. 534,040

1 Claim. (Cl. 267—9)

This invention relates to improvements in friction shock absorbers, especially adapted for use with truck springs of railway cars for dampening or snubbing the action of the springs.

One object of the invention is to provide a simple and efficient shock absorber adapted to replace one or more of the spring units of a railway car truck spring cluster, comprising a friction post, a friction clutch embracing and slidingly engaging the post, and spring means opposing relative lengthwise movement of the clutch and post, wherein means is provided for anchoring the parts to each other to hold the mechanism assembled.

A more specific object of the invention is to provide a friction shock absorber as set forth in the preceding paragraph, wherein the friction clutch comprises a plurality of friction shoes and a coil spring surrounding the shoes to contract the same about the post, and the post is provided with beadlike enlargements or lugs having shouldered engagement with the shoes to limit relative lengthwise separation of the post and shoes and hold the mechanism assembled.

Other objects of the invention will more clearly appear from the description and claim hereinafter following.

Figure 1:
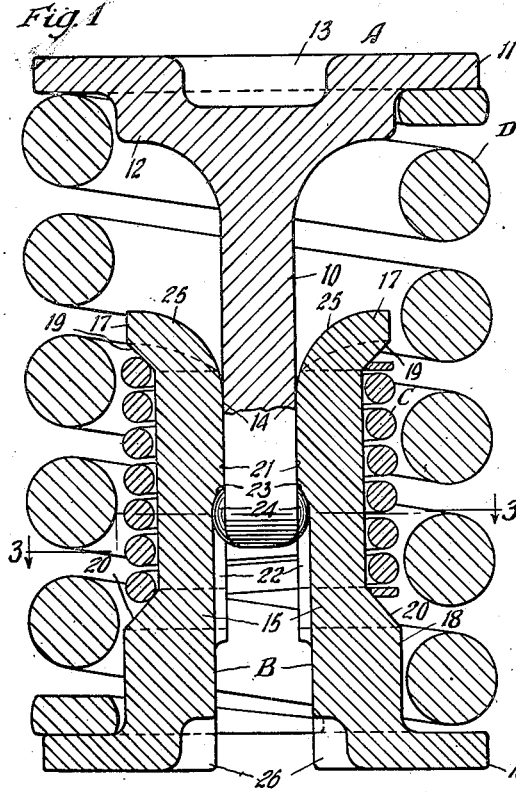
Figure 2:
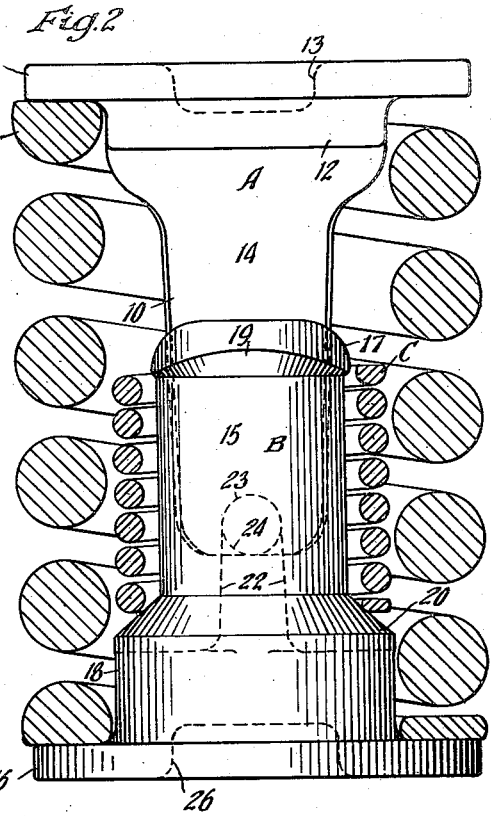
Figure 3:
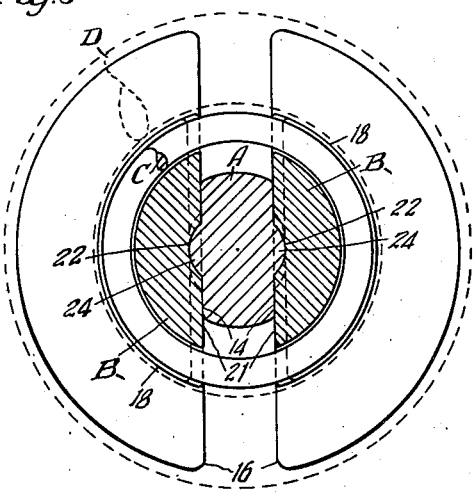
Figure 4:
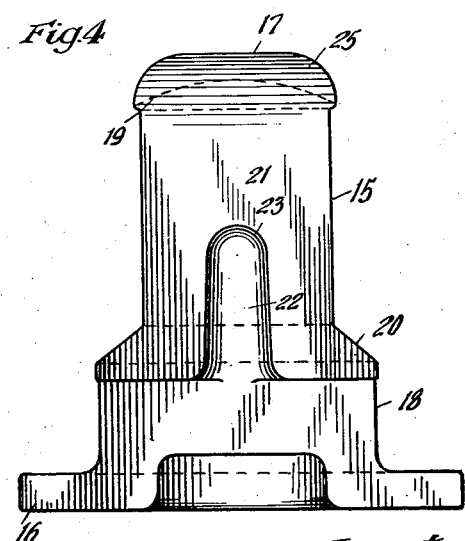

In the drawing forming a part of this specification, Figure 1 is a transverse, vertical sectional view of my improved shock absorber. Figure 2 is a side elevational view, looking from right to left in Figure 1, the outer coil spring of the device being shown in vertical section. Figure 3 is a transverse, horizontal sectional view, corresponding substantially to the line 3—3 of Figure 1. Figure 4 is an elevational view of the left hand shoe in Figure 1, looking from right to left in said figure, that is, showing an elevational view of the inner side of said shoe.

My improved shock absorber comprises broadly a friction post A; two friction shoes B—B; an inner spring C surrounding the shoes and having wedging engagement therewith; and an outer heavy coil spring D surrounding the shoes and post and opposing relative lengthwise movement thereof.

The friction post A comprises a relatively wide platelike member 10, which forms the friction post proper, and a laterally outwardly projecting disclike flange 11 at the upper end of the plate 10 forming a follower member. The disclike flange 11 has a downwardly offset, central boss 12 which is hollow, as shown, thereby providing an upwardly opening recess 13 which forms a seat for accommodating the usual spring centering projection of the upper spring follower plate of the truck spring cluster. The platelike member 10 depends from the boss 12 and presents longitudinally extending, flat friction surfaces 14—14 on opposite sides thereof.

The friction shoes B—B, which are two in number, are of identical design. Each shoe comprises an upstanding platelike portion 15 having a laterally outwardly projecting base flange 16 at the lower end thereof. At the upper end, the plate section 15 of each shoe B is laterally outwardly enlarged, as indicated at 17. Adjacent the lower end, the plate 15 is also laterally outwardly enlarged, as indicated at 18, said enlarged portion merging with the base flange 16. The outer surface of each shoe, between the enlargements at the upper and lower ends thereof, is transversely curved. The enlarged portions also have their outer vertical faces transversely curved. The enlargements 17 and 18 are provided with opposed, inner wedge faces 19 and 20 which are of conical contour. On the inner side, each shoe B presents a vertically extending, flat friction surface 21 and the friction surface 21 is provided with a lengthwise extending slot 22. The wall of the slot is transversely rounded, as clearly shown in Figure 3, thereby providing a transversely curved guide channel. The slot 22 terminates some distance inwardly of the upper end of the shoe and the end wall thereof is rounded to form a concave stop shoulder 23 for a purpose hereinafter pointed out.

The shoes B—B embraces the post A at opposite sides with their friction surfaces 21—21 respectively engaging the friction surfaces 14—14 of the post.

As shown most clearly in Figures 1 and 2, the post A is provided with laterally projecting enlargements or lugs 24—24 at opposite sides thereof, which are of beadlike formation and form stops which cooperate with the stop shoulders 23—23 of the shoes to limit lengthwise separation of the post and shoes. The lugs 24—24 are slidingly engaged within the slots 22—22.

The inner spring C, which is in the form of a helical coil, surrounds the shoes B—B and closely embraces the same. The spring C has its upper and lower ends in direct wedging engagement with the wedge faces 19 and 20 of the shoes. This spring is under predetermined compression and wedges the shoes against the post.

The outer spring D is also in the form of a helical coil and surrounds the post and shoes and bears at its upper and lower ends on the flange 11 of the post and the flanges 16—16 of the shoes.

In assembling the mechanism, the spring C is placed around the shoes with its opposite ends engaging the wedge faces 19 and 20. The outer coil spring D is then placed about the shoes with its lower end resting on the flanges 16—16 of the same. The friction post A is assembled with the friction shoes B—B by forcing the plate section 10 of the post downwardly between the shoes. In this connection it is pointed out that the inner sides of the upper ends of the shoes are beveled or rounded off, as indicated at 25—25, to facilitate entrance of the post between the shoes. The post is forced downwardly until the beadlike lugs 24—24 thereof engage or seat in the slots 22—22, the shoes being snapped together by the action of the inner spring C to engage the lugs 24—24 underneath the stop shoulders 23—23 at the inner ends of the slots 22—22 of the shoes.

My improved shock absorber is substituted for one or more of the spring units of a truck spring cluster, being interposed between the top and bottom spring follower plates of said cluster. As shown in Figure 1, the lower ends of the shoes are recessed on their inner sides, as indicated at 26—26, to receive the spring centering projection of the bottom spring follower plate of the truck spring cluster.

The operation of my improved shock absorber is as follows: Upon the cluster of springs of the railway car truck being compressed between the spring follower plates of the cluster, the friction post A and the friction shoes B—B are moved relatively toward each other in lengthwise direction, against the resistance of the spring D. Due to the wedging action between the spring C and the shoes, the required frictional resistance is produced between the post A and the shoes to snub the action of the truck springs.

Upon the spring follower plates of the truck springs being moved apart, during recoil of said springs, the expansive action of the spring D restores all of the parts to the normal release position shown in Figure 1, upward movement of the post being limited by engagement of the lugs 24—24 thereof with the shoulders 23—23 of the shoes.

I have herein shown and described what I now consider the preferred manner of carrying out my invention, but the same is merely illustrative and I contemplate all changes and modifications that come within the scope of the claim appended hereto.

I claim:

In a friction shock absorber, the combination with a friction post having longitudinally extending friction surfaces at opposite sides thereof, said post having a laterally outwardly extending follower flange at the outer end thereof and rounded beadlike stop lugs at the inner end projecting from the friction surface sides thereof; of a pair of friction shoes embracing the inner end of the post at the friction surface sides, said shoes having longitudinally extending friction surfaces on the inner sides slidably engaged with the friction surfaces of the post, said shoe friction surfaces having longitudinally extending, transversely curved slots therein receiving the lugs of the post, said slots having rounded end walls at their inner ends forming stop shoulders with which said lugs engage to limit relative lengthwise separation of the post and shoes; wedge projections at opposite ends of said shoes on the outer sides thereof; a laterally outwardly projecting follower flange at the outer end of each shoe; an inner coil spring surrounding said shoes between the wedge projections thereof, said spring being under compression and in wedging engagement with said projections; and an outer coil spring surrounding said post and shoes and bearing at opposite ends on the follower flange of the post and the follower flanges of the shoes to oppose relative lengthwise approach of the same.

GEORGE E. DATH.